(12) United States Patent
Valembois et al.

(10) Patent No.: US 6,755,020 B1
(45) Date of Patent: Jun. 29, 2004

(54) SHOCKPROOF MECHANISM, IN PARTICULAR FOR USE IN SPACE SECTOR

(75) Inventors: Guy Valembois, Blagnac (FR); Dominique Medus, L'Union (FR); Jean Baricos, Ramonville-Saint-Agne (FR)

(73) Assignee: Etienne Lacroix Tous Artifices SA, Muret (FR)

( * ) Notice: Subject to any disclaimer, the term of this patent is extended or adjusted under 35 U.S.C. 154(b) by 0 days.

(21) Appl. No.: 10/148,703

(22) PCT Filed: Oct. 25, 2000

(86) PCT No.: PCT/FR00/02976

§ 371 (c)(1),
(2), (4) Date: Sep. 4, 2002

(87) PCT Pub. No.: WO01/40664

PCT Pub. Date: Jun. 7, 2001

(30) Foreign Application Priority Data

Nov. 30, 1999 (FR) .............................. 99 15178

(51) Int. Cl.$^7$ ............................ F01K 7/00; F01B 29/00; F15B 15/19; F15B 15/22
(52) U.S. Cl. .............................. 60/509; 60/512; 60/513; 60/515; 60/638
(58) Field of Search .......................... 60/509, 512, 513, 60/515, 638

(56) References Cited

U.S. PATENT DOCUMENTS

| 2,857,890 | A |   | 10/1958 | Scott |            |
|-----------|---|---|---------|-------|------------|
| 4,573,322 | A | * | 3/1986  | Fohl  | .......... 280/806 |
| 4,842,106 | A | * | 6/1989  | Ludwig et al. | .......... 188/268 |
| 5,495,790 | A | * | 3/1996  | Greiner | .......... 280/806 |
| 5,639,120 | A | * | 6/1997  | Kmiec et al. | .......... 280/806 |

FOREIGN PATENT DOCUMENTS

| FR | 2534642 | 4/1984 |
| GB | 2004984 | 4/1979 |

* cited by examiner

Primary Examiner—Sheldon J. Richter
(74) Attorney, Agent, or Firm—Blakely, Sokoloff, Taylor & Zafman

(57) ABSTRACT

The invention concerns a device forming a mechanism, in particular for use in the space sector, characterised in that it comprises in combination: a material (300) with low melting point capable of producing a soldering joint, at least heating means (400), a structure having an architecture with a zone blocked by the low melting point material (300), capable of being released by liquefying the low melting point material, and means for forced rolling of the low melting point metal (300) in liquid state, after the heating means (400) have been activated, to produce a shock absorbing function.

47 Claims, 3 Drawing Sheets

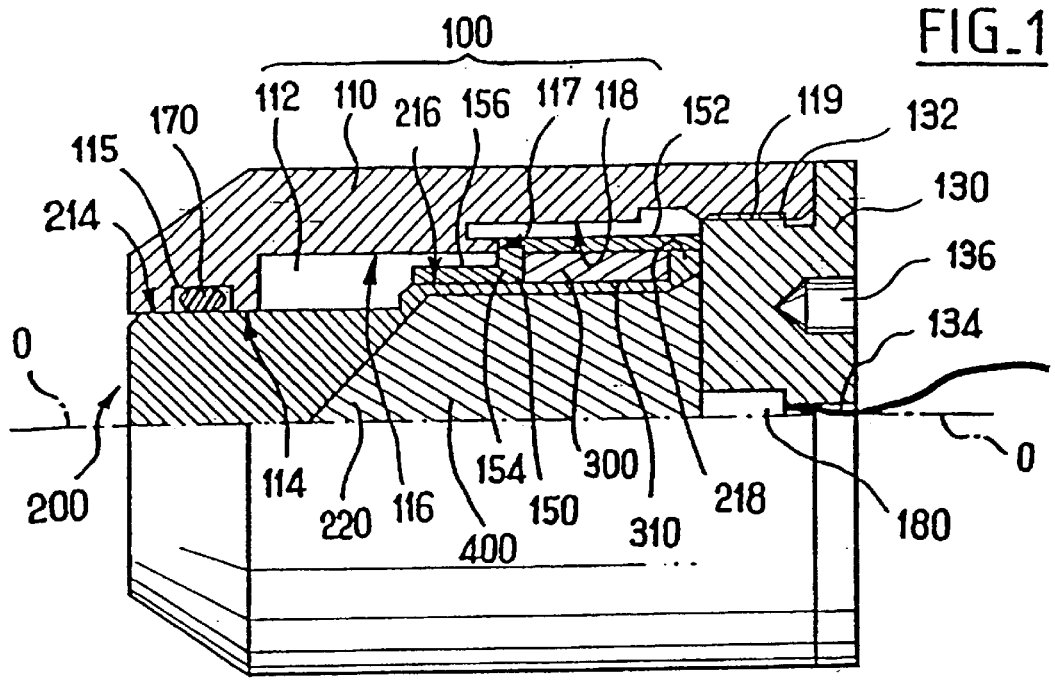
FIG_1
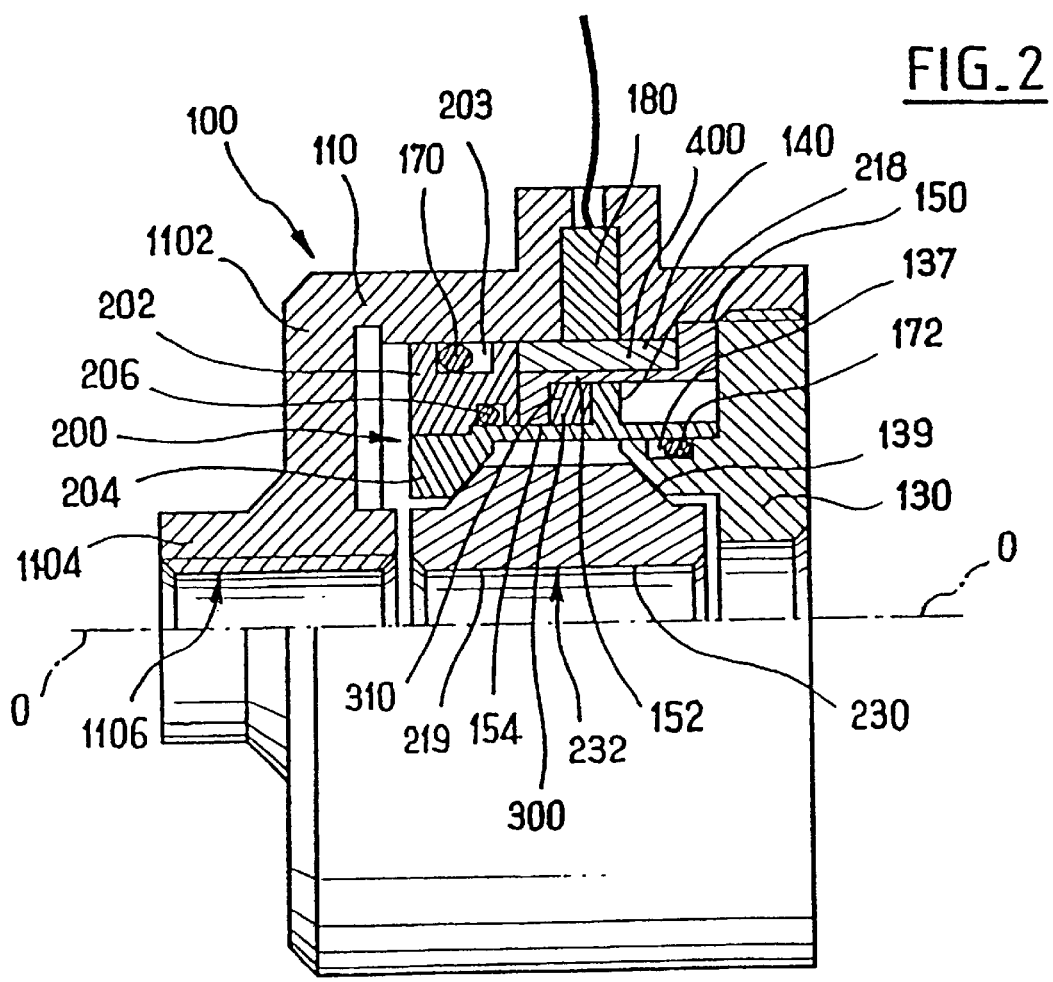
FIG_2

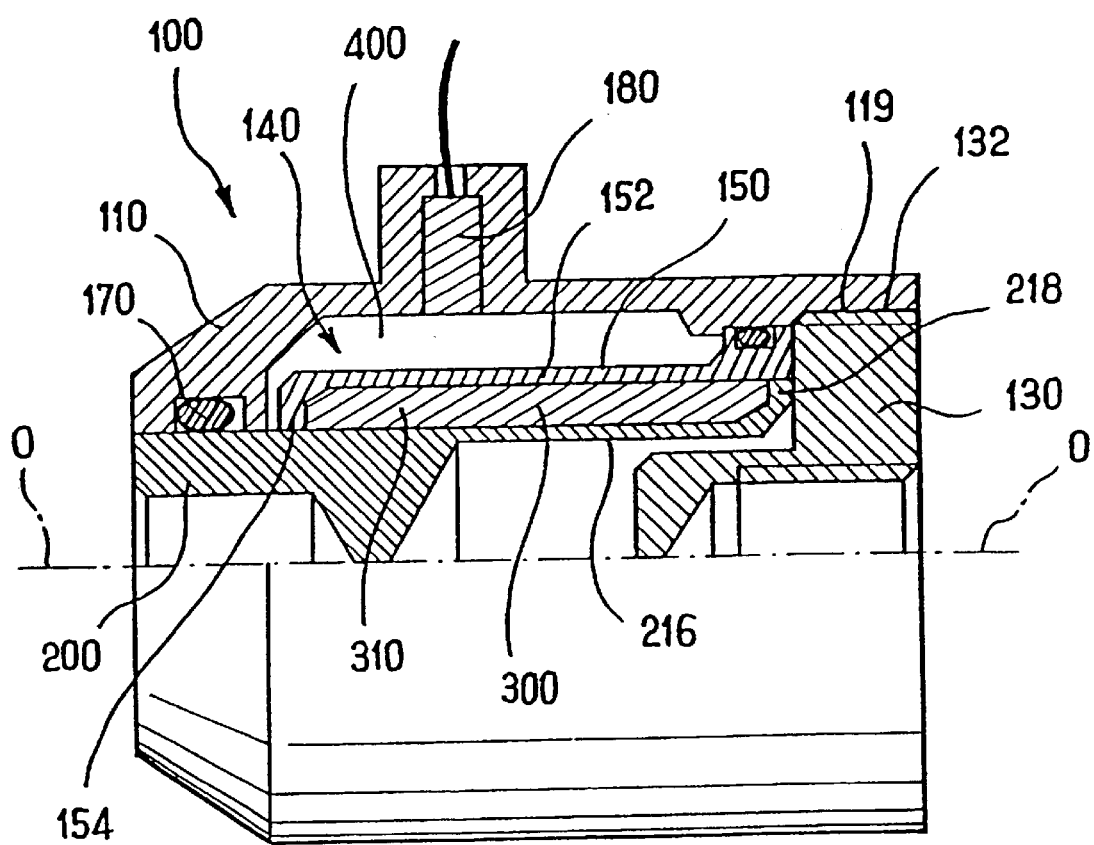
FIG_3

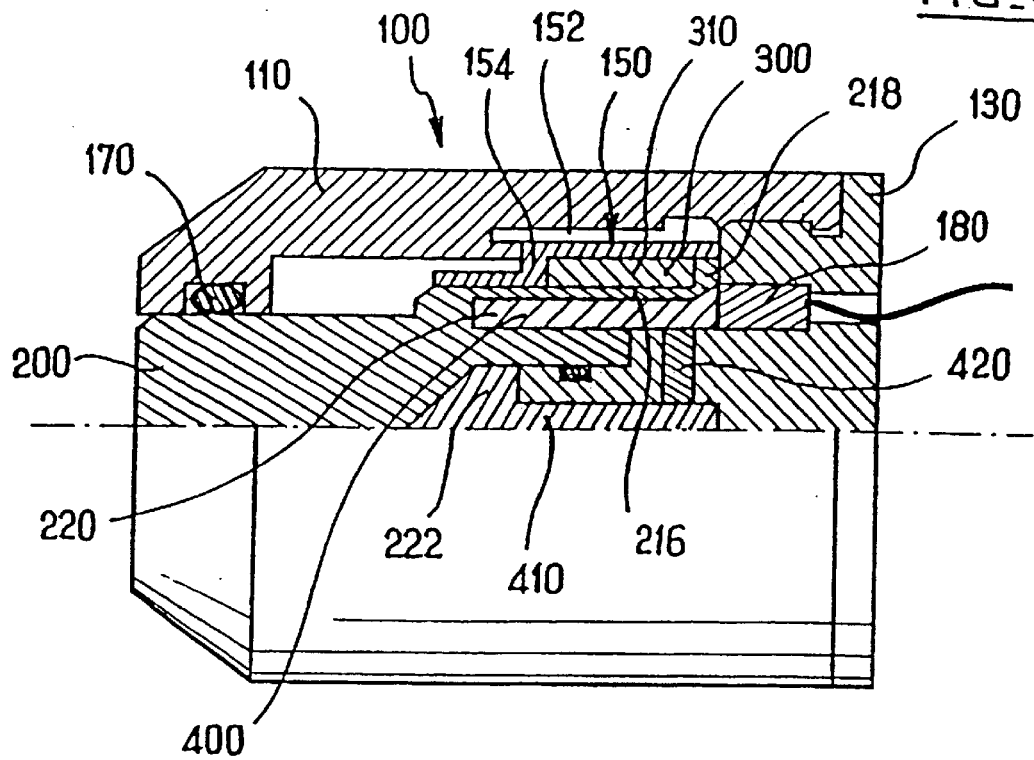
FIG_4
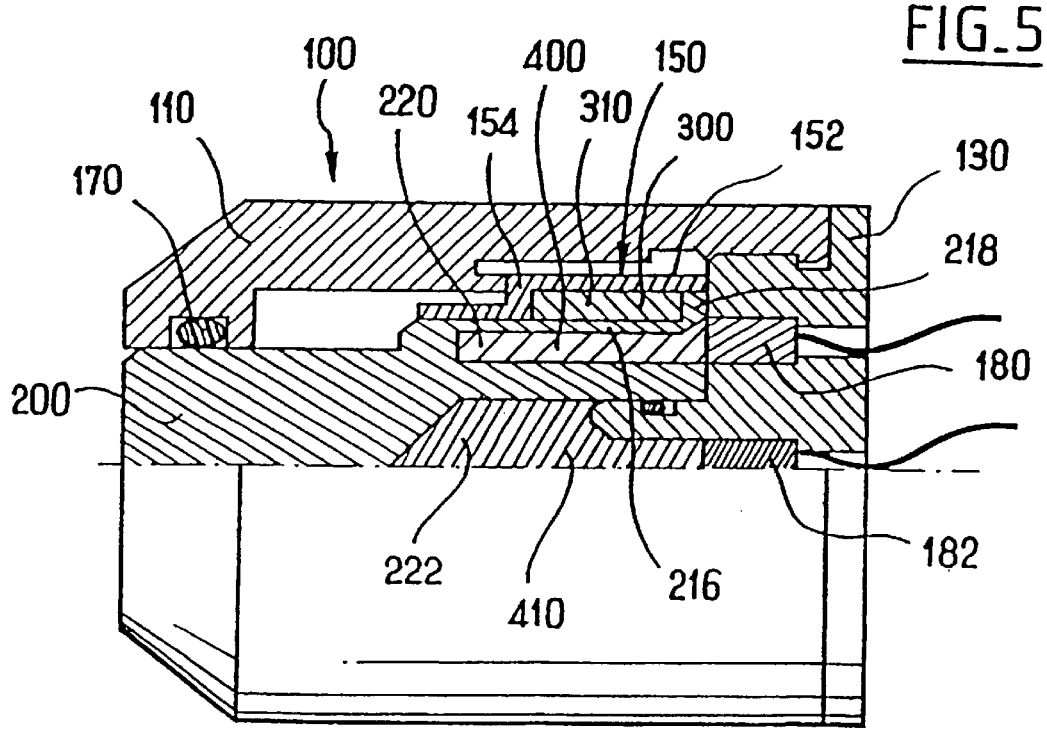
FIG_5

SHOCKPROOF MECHANISM, IN PARTICULAR FOR USE IN SPACE SECTOR

The present invention relates to the field of mechanisms actuated by a thermal effect, and particularly but not exclusively to the field of pyromechanisms, i.e. the field of mechanisms controlled by a pyrotechnical effect.

A particular, but non-exclusive, application of the present invention lies in the field of the space industry, for example on launchers or satellites, in particular in the form of shears, valves, strap cutters, etc.

Known means actuated by a thermal effect, and in particular known pyrotechnical means, provide a wide range of options. In particular they present considerable potential in terms of amount of energy delivered per unit on-board mass, and they also present high reliability.

Nevertheless, those mechanisms also suffer from a major drawback: namely the large dynamic effect induced by operating them.

The levels of shock and vibration often make it impossible for fragile equipment to be used in their vicinity.

The present invention seeks to provide a novel mechanism which does not present the above drawback.

In the context of the present invention, this object is achieved by equipment comprising in combination:
  a low melting point material:
  at least one heater means; and
  means suitable for throttling the low melting point material in the liquid state, after the heater means have operated, thereby performing a shock-absorbing function.

According to an advantageous characteristic of the present invention, the low melting point material is a metal.

According to another advantageous characteristic of the present invention, the heater means is a highly exothermal pyrotechnical composition.

According to another advantageous characteristic of the present invention, the low melting point material is adapted to perform soldering and the device has a structure whose architecture presents a zone that is blocked by the low melting point material and that is suitable for being released by liquefaction of the low melting point material when the heater means are implemented.

Other characteristics, objects and advantages of the present invention appear on reading the following detailed description and with reference to the accompanying drawings which are given as non-limiting examples and in which:

FIG. 1 is a diagram of a structure of the present invention in the form of a linear actuator seen in partial longitudinal axial section; and FIGS. 2 to 5 show four variant embodiment mechanisms in accordance with the present invention.

The description begins with the linear actuator structure shown in accompanying FIG. 1.

The system shown in accompanying FIG. 1 essentially comprises a structure made up of two assemblies 100, 200 capable of moving relative to each other, a block 300 of low melting point metal, and a highly exothermal pyrotechnical composition 400.

Specifically, the two assemblies 100 and 200 are capable of moving in relative translation along the central axis O—O of the structure.

The first assembly 100 is made up of three parts: a body 110, a plug 130, and a ring 150.

The body 110 is generally circularly cylindrical about the axis O—O. More precisely, the body 110 possesses a stepped central internal channel 112. In FIG. 1, the channel 112 is subdivided into three axially-juxtaposed sections 114, 116, and 118.

The section 118 presenting the largest inside diameter is adjacent to one end of the assembly 100 and is provided with tapping 119 over a fraction of its length. The tapping 119 is complementary to a thread 132 provided on the plug 130.

The section 114 presenting the smallest inside diameter is adjacent to the opposite, second end of the assembly 100. This small section 114 is provided on its inside surface with an annular groove 115 designed to receive an O-ring seal 170 for providing sealing between the two assemblies 100 and 200.

The section 116 of inside diameter that is intermediate between the inside diameters of the above-described sections 114 and 118 is situated axially between said two sections.

The plug 130 is generally in the form of a disk extending perpendicularly to the axis O—O. As mentioned above, the plug 130 has a thread 132 complementary to the tapping 119. The plug 130 can thus be screwed onto the first end of the body 110 in order to close it. The plug 130 possesses a through axial channel 134, for example a central channel. The channel 134 is designed to receive an initiator 180 for the pyrotechnical composition 400, for example an electrical initiator.

The plug 130 is preferably provided with structures, e.g. a series of off-center holes 136 to make it easier to turn the plug 130 to ensure that it is fixed to the body 110.

A step 117 in the form of an annular ring extending transversally to the axis O—O is defined at the junction zone between the largest diameter section 118 and the intermediate diameter section 116, said ring facing towards the first end of the assembly 100.

In the embodiment shown in FIG. 1, the second assembly 200 is constituted by a piston centered on the axis O—O. The outside surface of the piston is stepped.

Still more precisely, in the embodiment shown in FIG. 1, the piston 200 is stepped to form three sections: 214, 216, and 218.

The smallest diameter section 214 is situated at the second end of the body 110. Its outside diameter is complementary to the inside diameter of the section 114 of the body 110. The above-mentioned O-ring 170 bears against said outside surface to provide sealing between the two assemblies 100 and 200.

The largest diameter section 218 of the piston 200 is situated in the vicinity of the first end of the body 110. The outside diameter of this section 218 lies between the inside diameter of the section 116 and the inside diameter of the section 118 of the body 110.

The section 216 of the piston 200 is situated axially between the two above-mentioned sections 214, 218. It possesses an outside diameter lying between the outside diameters of the sections 114 and 116 of the body 110.

The ring 150 comprises two cylindrical segments 152 and 156 centered on the axis O—O and interconnected by a central annulus 154 extending transversally to the axis O—O.

The cylindrical segment 152 posses an outside diameter lying between the inside diameter of the section 118 of the body and the inside diameter of the intermediate section 116 of the body 110. The inside diameter of this cylindrical segment 152 is complementary to the outside diameter of the large section 218 of the piston, and it rests against this large section. The cylindrical segment 152 is situated between the step 117 and the internal axial face of the plug 130. The axial length of the cylindrical segment 152 is such that it is prevented from moving, being clamped between the two above-mentioned elements, when the plug 130 is assembled to the body 110.

The second segment 156 of the ring 150 possesses an outside diameter that is smaller than the inside diameter of the section 116 and an inside diameter complementary to the outside diameter of the section 216 of the piston 200. It rests thereon.

The radial extent of the intermediate annulus 154 over the inside of the cylindrical segment 152 is equal to the radial extent of the segment 218 of the piston over the outside of the section 216.

The ring 150 thus operates with the piston 200 to define a chamber 310 housing a volume of low melting point metal 300.

This chamber 310 is defined radially outwards by the cylindrical segment 152 of the ring 150, radially inwards by the wall of the piston constituting the intermediate section 216, axially towards the first end by the large section 218 of the piston, and axially towards the second end by the intermediate annulus 154 of the ring 150.

The piston 200 is also provided with a central blind chamber 220 which opens out to the first end of the piston facing the electrical initiator 180 and which houses the pyrotechnical composition 400.

The pyromechanism shown in FIG. 1 operates essentially as follows: prior to using the electrical initiator 180 and initiating the pyrotechnical composition 400, the soldered connection constituted by the low melting point metal 300 at the interfaces between the parts 156 and 216 and between the parts 152 and 218, and also the solid phase of this metal 300 situated inside the chamber 310 provides reliable and effective blocking of the structure ensuring that the two assemblies 100 and 200 are prevented from moving relative to each other, the ring 150 being prevented from moving relative to the body 110 and to the plug 130. It should be observed that in this position, the small section 214 of the piston 200 can emerge at least in part to the outside of the assembly 100.

When the electrical initiator 180 is powered, that triggers the pyrotechnical composition 400 and thereby rapidly raises the temperature of the metal 300 sufficiently to cause it to melt, thereby releasing the piston 200 relative to the assembly 100. The gas coming from the chemical reaction of the pyrotechnical composition 400 causes the chamber 220 to expand and thus moves the piston 200 away from the plug 130 in translation along the axis O—O. This displacement of the piston 200 reduces the volume of the chamber 310 and thus transfers the low melting point metal 300 by throttling it between the adjacent surfaces of the ring 150 and of the piston 200, thereby performing a damping function on the movement.

Thereafter, solidification of the low melting point metal 300 reconstitutes a solder connection and finally blocks the device in a new state in which the piston 200 extends further from the second end of the body 100 than it did in the initial state.

The person skilled in the art will easily understand that such a pyromechanism constitutes an advantageous linear actuator.

Naturally, variant embodiments of the device as described above can be envisaged.

Firstly, it is possible to provide for the low melting point metal 300 to be throttled, not by the interfaces defined between the ring 150 and the piston 200, but in calibrated bores formed in the ring 150 or in the piston 200 defining the chamber 310.

Secondly, as described below in greater detail, it is possible to envisage ensuring that movement of the piston 200 is driven not by the gas resulting from the pyrotechnical composition 400, but under drive from an auxiliary drive member, for example a spring element.

The low melting point metal 300 can be thermally insulated from the external environment so as to avoid any risk of the metal 300 melting prior to firing the pyrotechnical composition 400.

To this end, the body 110 and the plug 130 disposed on the outside of the chamber 310 are preferably made out of materials presenting poor thermal conduction properties or that are thermally insulating, while the piston 200 whose wall forming the intermediate section 216 is interposed between the pyrotechnical composition 400 and the low melting point metal 300 is preferably made of a metal that is a good conductor of heat.

The metal 300 must also be selected in such a manner as to present a melting or softening temperature that is higher than ambient temperature so as to ensure that it melts only when the initiator 180 is operated.

The variant embodiment shown in FIG. 2 is described below.

This figure shows a similar structure made up of two assemblies 100 and 200 capable of moving in relative translation along an axis O—O, a low melting point metal 300, and a pyrotechnical composition 400.

At rest, the low melting point metal 300 prevents the two assemblies 100 and 200 from moving relative to each other. When the pyrotechnical composition 400 is fired, the low melting point metal 300 is liquefied and the gas developed by the pyrotechnical composition 400 drives the assemblies 100 and 200 in relative displacement. The structure is again prevented from moving once the metal 300 has cooled down. In addition, in the embodiment of FIG. 2, the metal 300 is situated in a chamber 310 defined between a piston 200 and a ring 150 which is itself prevented from moving between a body 110 and a plug 130. More precisely, the chamber 310 is defined by elements of the ring 250 and by elements of the piston 200 that are generally L-shaped, each possessing both an axial segment and a radial segment.

However, compared with the device shown in FIG. 1, the device shown in FIG. 2 presents certain characteristic points, including specifically the following.

In FIG. 2, the piston 200 is formed by an annular structure which does not directly provide the delivered actuator effect, but which controls an outlet element.

More precisely, this outlet element is constituted by a structure 230 capable of being formed, for example, by a nut, a clamp system made up of a plurality of segments, e.g. threaded segments uniformly distributed around the axis O—O, or any other equivalent means. This element forming an outlet actuator 230 is held captive in an initial rest position between two truncated cones 219, 139 formed respectively on the piston 200 and on the plug 130.

In addition, the piston 200 is made up of two parts 202 and 204 which are assembled together by screw engagement with an interposed O-ring 206.

The O-ring 170 is placed in a groove 203 of the part 202 to provide sealing between the piston 200 and the body 110 in a manner that is comparable with that of FIG. 1.

An additional O-ring 172 placed in a groove 137 of the plug 130 provides sealing between the plug and the piston 200.

The initiator 180 is placed in a radial passage facing the axis O—O passing through the wall of the body 110. The initiator 180 thus opens out into an annular chamber 140 containing the pyrotechnical composition 400. This chamber 140 is radially defined outwards by the inside wall of the body 110, axially beside the second end of the system by a transverse surface of the piston 200, and axially beside the first end and radially beside the inside of the ring 150.

It can also be observed that at the second end, the body 110 presents a plate 1102 directed radially inwards and carrying a sheath 1104 provided with internal tapping 1106. Such tapping 1106 can receive any complementary threaded element for holding temporarily relative to an associated element held by the tapping 232 of the central element 230 as formed by a nut or by a clamp.

When the initiator 180 is operated, the device shown in FIG. 2 can be used for controlled release of any assembly made up of threaded elements engaged respectively in the tappings 106 and 232.

In this case also, when the electrical initiator 180 initiates the highly exothermal pyrotechnical charge 400, the low melting point metal 300 initially soldering the ring 150 and the piston 200 together melts so as to release them for movement. The gas coming from the combustion of the pyrotechnical composition 400 pushes the piston 200 towards the second end of the structure. The liquid metal 400 is then throttled through the set of clearances formed between the piston 200 and the ring 150 so as to provide a damping function controlling the dynamic behavior of the piston.

The variant embodiment shown in accompanying FIG. 3 is described below.

In this variant, there is again a structure comprising two assemblies 100, 200 capable of relative displacement, but initially prevented from moving by a low melting point metal 300 forming a solder connection between a ring 150 connected to the first assembly and the piston-forming second assembly 200, together with a highly exothermal pyrotechnical composition 400 associated with an electrical initiator 180.

Furthermore, the first assembly 100 is again formed by assembling together a body 110 and a plug 130.

The pyrotechnical initiator 180 is placed in a radial channel passing through the wall of the outer body 110 and opening out in an annular chamber 140 defined by the body 110, the ring 150, and in its radially inner portion by the outer periphery of the piston 200.

The ring 150 is also connected to the first assembly 100. For this purpose, it possesses a portion clamped between a shoulder of the body 110 and the plug 130.

The annular chamber 310, which contains the low melting point metal 300 providing a soldered connection, is situated radially on the inside of the chamber 140 and contains the pyrotechnical composition 400, being defined by two pairs of L-shaped walls belonging respectively to the ring 150 and to the piston 200, each of these two pairs of walls possessing both a respective wall 154, 218 extending radially transversally to the axis O—O and a respective wall 152, 216 extending axially parallel to the axis O—O.

In FIG. 3, the chamber 140 containing the pyrotechnical composition 400 is radially defined only on the inside by the piston 200, so it will be understood that any gas generated by the pyrotechnical composition 400 cannot drive movement of the structure.

In this context, in FIG. 3, after the solder 300 has melted, the piston 200 is driven towards the second end of the structure by an auxiliary drive member, for example a spring. In a variant, the piston 200 can be driven by an element outside the structure shown in FIG. 3, for example a strap pulling the piston 200 out from the body 110.

As mentioned above, the embodiment shown in FIG. 3 serves, amongst other things, to release parts under tension, such as straps, cables, etc.

The variant embodiment shown in FIG. 4 is described below.

This variant has the same general dispositions as shown in FIG. 1 and described above. Nevertheless, it differs from the embodiment described above with reference to FIG. 1 in that in FIG. 4, the structure has two pyrotechnical compositions 400, 410, interconnected by a pyrotechnical relay 420.

The first pyrotechnical composition 400 communicates with the electrical initiator 180. It is placed in an annular chamber 220 formed in the piston 200 close to the metal 300, and more precisely radially on the inside of the chamber 310 defined by the ring 150 and the outer periphery of the piston 200.

This first pyrotechnical composition 400 is highly exothermal but, where appropriate, it need not generate much gas. Its function is to melt the adjacent metal 300.

The second pyrotechnical composition 410 is placed in a blind chamber 220 formed in a central position in the piston 200 and opening out to the first end of the structure beside the closure plug 130. A pyrotechnical delay 420 is placed in a radial passage interconnecting the two chambers 220, 222. Thus, the pyrotechnical composition 410 is fired later than the first pyrotechnical composition 400, after a delay defined by the time taken to burn the pyrotechnical delay 420. The second pyrotechnical composition 410 is designed to generate a volume of gas that is sufficient to move the piston 200 as described above with reference to FIG. 1.

By using two pyrotechnical compositions 400, 410 designed respectively to melt the metal 300 and to move the piston 200, it is possible to achieve accurate sequential control over the operation of the structure.

The variant shown in FIG. 5 is described below.

This variant also uses the general concepts illustrated in FIG. 1 and described above. However, the variant embodiment shown in FIG. 5 has two pyrotechnical compositions 400, 410 intended respectively to melt the metal 300 and to generate the gas for moving the piston 200. However, unlike FIG. 4, the two pyrotechnical compositions 400, 410 are not interconnected by a pyrotechnical delay. On the contrary, they are associated with respective initiators, e.g. electrical initiators 180, 182 carried by the plug 130. In this case, sequencing is not controlled by a pyrotechnical effect due to a delay as described for FIG. 4, but by applying appropriate signals to the respective initiators 180, 182.

Otherwise, in FIG. 5, and comparably to FIG. 4, the highly exothermal first pyrotechnical composition 180 is situated adjacent to the metal 300 in an annular chamber of the piston 200, while the gas-generating, second pyrotechnical composition 410 is situated in a blind central chamber 222 of the piston 200.

Naturally the present invention is not limited to the particular embodiments described above, but extends to any variant within the spirit of the invention.

In particular, although the device of the present invention in the embodiments described above essentially constitutes actuation for linear displacement along the axis O—O of the device, it is possible in a variant to provide a device which generates forces acting transversally to the axis O—O, e.g. clamping forces acting by tightening segments that extend generally axially and that are uniformly distributed around the axis O—O, and by displacing wedge-shaped or conical means associated with the piston 200 that moves.

By way of non-limiting example, the low melting point metal 300 can comprise:

Bi50/Pb28/Sn22 (for a melting temperature of about 95° C.–110° C.); or

In (for a melting temperature of about 156° C.); or

Sn or Sn85/Zn15 (for a melting temperature of about 200° C.–250° C.); or

Pb82.5/Cd17.5; or

Pb96/Sb4 (for a melting temperature of about 250° C.–300° C.); whereas the pyrotechnical composition 400 can comprise:

Al+Fe$_2$O$_3$; or

Mg+Fe$_2$O$_3$; or

Al+CuO; or

Mg+CuO.

Furthermore, in the context of the present invention:

the highly exothermal pyrotechnical composition 400 can be replaced by any suitable equivalent heater means, for example electrical heater means; and the low melting point metal 300 can be replaced by a suitable material, for example paraffin, a eutectic alloy, etc.

What is claimed is:

1. A mechanism-forming device, in particular for application in space, the device being characterized in that it comprises in combination:

a low melting point material (300);

at least one heater means (400); and means suitable for throttling the low melting point material (300) in the liquid state, after the heater means (400) have operated, thereby performing a shock-absorbing function, wherein said device further comprises at least two concentric surfaces (154, 216; 152, 218) defining, a set of clearances between them and provided respectively on parts (150, 200) that are capable of moving in order to throttle the low melting point material (300) through the set of clearances defined between said concentric surfaces.

2. A device according to claim 1, characterized that the fact that the low melting point metal (300) is adapted to perform soldering, and by the fact that the device further comprises a structure presenting architecture that possesses a zone that is blocked by the low melting point metal (300) and that is capable of being released by the low melting point material liquefying when the heater means are operated.

3. A device according to claim 1, characterized by the fact that the heater means comprise a pyrotechnical composition (4.00, 410) designed to generate a volume of gas that is sufficient to drive relative displacement of the two parts (100, 200) of the device.

4. A device according to claim 1, characterized by the fact that the chamber (310) housing the melting point material (300) is thermally insulated from the external environment.

5. A device according to claim 1, characterized by the fact that it has an external element, such as a resilient member of an element working in traction, suitable for driving relative displacement between the two parts (100, 200) of the device after the heater means (400) have been operated.

6. A device according to claim 1, characterized by the fact that it comprises an outer shell body (110) that is thermally insulating.

7. A device according to claim 1, characterized by the fact that it includes a piston (200) suitable for being moved out from a shell body after the heater means (200) have been operated, thereby forming a linear actuator.

8. A device according to claim 1, characterized by the fact that it has two parts (100, 230) capable of relative movement for releasing an assembly when the heater means are operated.

9. A device according to claim 1, characterized by the fact that it includes a nut (230) suitable for being released when the heater means are operated.

10. A device according to claim 1, characterized by the fact that it has a nut (230) made up of a plurality of segments uniformly distributed around an axis and suitable for being released when the heater means are operated.

11. A device according to claim 1, characterized by the fact that it includes a clamp structure constituted by a plurality of general axially extending segments (194) uniformly distributed around an axis 0—0 and suitable for moving towards one another during displacement of a piston (200) having an actuator surface in the form of a truncated cone, after the heater means (400) have been operated.

12. A device according to claim 1, characterized by the fact that it includes an initiator (160) associated with the heater means (400).

13. A device according to claim 1, characterized by the fact that the mechanism constitutes a pyromechanism.

14. A device according to claim 1, characterized by the fact that the heater means (400) comprise at least one highly exothermal pyrotechnical composition.

15. A device according to claim 1, characterized by the fact that the heater means (400) comprise electrical heater means.

16. A device according to any one of claims 1 to 25, characterized by the fact that the low melting point material (300) is selected from the group comprising paraffin and eutectic alloys.

17. A device according to claim 1, characterized by the fact that the low melting point material (300) is selected from the group comprising paraffin and eutectic alloys.

18. A device according to claim 1, characterized by the fact that the heater means comprises two pyrotechnical compositions (400, 410), respectively one composition that is highly exothermal and another composition that generates gas, thereby respectively melting the low melting point material (300) and driving the structure.

19. A device according to claim 18, characterized by the fact that the two pyrotechnical compositions (400, 410) communicate via a pyrotechnical delay (420).

20. A device according to claim 18, characterized by the fact that the two pyrotechnical compositions (400, 410) are actuated by respective initiators (180, 182).

21. A mechanism-forming device, in particular for application in space, the device being characterized in that it comprises in combination:

a low melting point material (300);

at least one heater means (400); and means suitable for throttling the low melting point material (300) in the liquid state, after the heater means (400) have operated, thereby performing a shock-absorbing function, wherein said device comprises at least one calibrated bore opening out into a chamber containing the low melting point material (300) for throttling purposes.

22. A device according to claim 21, characterized that the fact that the low melting point metal (300) is adapted to perform soldering, and by the fact that the device further comprises a structure presenting architecture that possesses a zone that is blocked by the low melting point metal (300) and that is capable of being released by the low melting point material liquefying when the heater means are operated.

23. A device according to claim 21, characterized by the fact that the heater means comprise a pyrotechnical composition (400, 410) designed to generate a volume of gas that is sufficient to drive relative displacement of the two parts (100, 200) of the device.

24. A device according to claim 21, characterized by the fact that it has an external element, such as a resilient member of an element working in traction, suitable for driving relative displacement between the two parts (100, 200) of the device after the heater means (400) have been operated.

25. A device according to claim 21, characterized by the fact that the low melting point material (300) is situated in a chamber (310) designed to be reduced in volume during operation of the heater means (400).

26. A device according to claim 21, characterized by the fact that the chamber (310) housing the melting point material (300) is thermally insulated from the external environment.

27. A device according to claim 21, characterized by the fact that it comprises an outer shell body (110) that is thermally insulating.

28. A device according to claim 21, characterized by the fact that it includes a piston (200) suitable for being moved out from a shell body after the heater means (200) have been operated, thereby forming a linear actuator.

29. A device according to claim 21, characterized by the fact that it has two parts (100, 230) capable of relative movement for releasing an assembly when the heater means are operated.

30. A device according to claim 21, characterized by the fact that it includes, a nut (230) suitable for being released when the heater means are operated.

31. A device according to claim 21, characterized by the fact that it has a nut (230) made up of a plurality of segments uniformly distributed around an axis and suitable for being released when the heater means are operated.

32. A device according to claim 21, characterized by the fact that it includes a clamp structure constituted by a plurality of general axially extending segments (194) uniformly distributed around an axis 0—0 and suitable for moving towards one another during displacement of a piston (200) having an actuator surface in the form of a truncated cone, after the heater means (400) have been operated.

33. A device according to claim 21, characterized by the fact that it includes an initiator (160) associated with the heater means (400).

34. A device according to claim 21, characterized by the fact that the mechanism constitutes a pyromechanism.

35. A device according to claim 21, characterized by the fact that the heater means (400) comprise at least one highly exothermal pyrotechnical composition.

36. A device according to claim 21, characterized by the fact that the heater means (400) comprise electrical heater means.

37. A device according to any one of claims 1 to 25, characterized by the fact that the low melting point material (300) is selected from the group comprising paraffin and eutectic alloys.

38. A device according to claim 21, characterized by the fact that the low melting point material (300) is selected from the group comprising paraffin and eutectic alloys.

39. A device according to claim 21, characterized by the fact that the chamber (310) housing the melting point material (300) is defined by two L shaped structures, each possessing both an axially extending wall (152, 216) and a radially-extending wall (254, 218) secured respectively to two assemblies (100, 200) capable of relative movement.

40. A device according to claim 39, characterized by the fact that the chamber (310) housing the melting point material (300) is defined at least in part by a ring (150) secured to a fixed body (110).

41. A device according to claim 40, characterized by the fact that the ring (150) is clamped between an outer shell body (110) and a closure plug (130).

42. A device according to claim 21, characterized by the fact that the heater means comprises two pyrotechnical compositions (400, 410), respectively one composition that is highly exothermal and another composition that generates gas, thereby respectively melting the low melting point material (300) and driving the; structure.

43. A device according to claim 42, characterized by the fact that the two pyrotechnical compositions (400,410) communicate via a pyrotechnical delay (420).

44. A device according to claim 42, characterized by the fact that the two pyrotechnical compositions (400, 410) are actuated by respective initiators (180, 182).

45. A mechanism-forming device, in particular for application in space, the device being characterized in that it comprises in combination:
   a low melting point material (300);
   at least one heater means (400); and
   means suitable for throttling the low melting point material (300) in the liquid state, after the heater means (400) have operated, thereby performing a shock-absorbing function, wherein the heater means comprise a pyrotechnical composition (400, 410) designed to generate a volume of gas that is sufficient to drive a relative displacement of two parts (100, 200) of the device.

46. A device according to claim 45, characterized that the fact that the low melting point metal (300) is adapted to perform soldering, and by the fact that the device further comprises a structure presenting architecture that possesses a zone that is blocked by the low melting point metal (300) and that is capable of being released by the low melting point material liquefying when the heater means are operated.

47. A device according to claim 45, characterized by the fact that it comprises at least two concentric surfaces (154, 216; 152, 218) provided respectively on parts (150, 200) that are capable of moving in order to throttle the low melting point material (300).

* * * * *

UNITED STATES PATENT AND TRADEMARK OFFICE
CERTIFICATE OF CORRECTION

PATENT NO. : 6,755,020 B1
DATED : June 29, 2004
INVENTOR(S) : Valembois et al.

It is certified that error appears in the above-identified patent and that said Letters Patent is hereby corrected as shown below:

Column 8,
Line 25, please delete "any one of claims 1 to 25" and insert -- claim 1 --.
Lines 27-28, please delete "selected form the group comprising paraffin and eutectic alloys" and insert -- a metal --.

Column 9,
Line 53, please delete "any one of claims 1 to 25" and insert -- claim 21 --.
Lines 55-56, please delete "selected form the group comprising paraffin and eutectic alloys" and insert -- a metal --.

Signed and Sealed this

Twenty-fifth Day of January, 2005

JON W. DUDAS
*Director of the United States Patent and Trademark Office*